United States Patent
El-Habhab (10) Patent No.: US 6,804,972 B2
(45) Date of Patent: Oct. 19, 2004

(54) DIRECT DRIVE MULTI-TEMPERATURE SPECIAL EVAPORATORS

(75) Inventor: Hussein El-Habhab, Mont Saint Aignan (FR)

(73) Assignee: Carrier Corporation, Syracuse, NY (US)

(*) Notice: Subject to any disclaimer, the term of this patent is extended or adjusted under 35 U.S.C. 154(b) by 200 days.

(21) Appl. No.: 10/016,400

(22) Filed: Dec. 10, 2001

(65) Prior Publication Data

US 2003/0106329 A1 Jun. 12, 2003

(51) Int. Cl.$^7$ .............................. F25B 5/00; F25B 13/00

(52) U.S. Cl. .......................... 62/196.4; 62/159; 62/200; 62/206; 62/217

(58) Field of Search ............................ 62/196.1, 196.3, 62/196.4, 199, 200, 217, 206, 159, 160, 324.1, 324.6

(56) References Cited

U.S. PATENT DOCUMENTS

| | | | | |
|---|---|---|---|---|
| 3,933,004 A | * | 1/1976 | Carter et al. | 62/199 |
| 4,389,855 A | * | 6/1983 | Ueda et al. | 62/206 |
| 4,914,926 A | * | 4/1990 | Gregory | 62/196.4 |
| 5,107,686 A | * | 4/1992 | Howland | 62/160 |
| 5,778,690 A | * | 7/1998 | Hanson et al. | 62/196.4 |
| 5,893,271 A | * | 4/1999 | Brink | 62/196.4 |

* cited by examiner

Primary Examiner—Harry B. Tanner
(74) Attorney, Agent, or Firm—Carlson, Gaskey & Olds (57) ABSTRACT

A system and method for controlling the climate within a storage container including at least two cargo areas. The system includes one compressor, one condenser, and two evaporators. Each of the evaporators includes a crankcase pressure regulator, a gas valve and a liquid valve. The crankcase pressure regulators provide a common pressure between each of the evaporators and the compressor regardless of the pressure at the evaporator. A control system selectively actuates the gas and liquid valves according to a predefined control mode to obtain and maintain a desired temperature.

15 Claims, 7 Drawing Sheets

DIRECT DRIVE MULTI-TEMPERATURE SPECIAL EVAPORATORS

BACKGROUND OF THE INVENTION

This invention relates to a climate control system for controlling simultaneous cooling and heating functions in separate compartments with one compressor and one condenser.

Delivery trucks and trailers transporting temperature sensitive cargo include specially designed climate control systems. Typically, climate control systems such as refrigeration systems include a motor driving a compressor mounted outside of a cargo area. Refrigerant flows from the compressor through a condenser outside the cargo area, and to at least one remotely located evaporator unit. The refrigerant flows through an evaporator coil in the cargo area and back to the compressor. Cooling fans mounted as part of the evaporator blow air across the evaporator coils such that the air is cooled and expelled into the cargo area.

One type of climate control system is a direct drive unit where the compressor is driven by the engine of the motor vehicle during travel and when standing for brief periods. A standby compressor operates when it is not practical to run the motor vehicle engine. A simple system includes only one compartment maintained at a single temperature. However, cargo compartments having more than one temperature-controlled compartment are being increasingly put into service. Cargo trucks with two cargo areas capable of maintaining separate temperatures increases the efficiency of the delivery truck and has become increasingly in demand as home delivery service of fresh and frozen foods has gained increased popularity.

A direct drive system including one compressor and one condenser is not practical for applications requiring heating or defrost in one compartment and cooling in another compartment. This is so because the heating function requires the use of coolant at high-pressure, where the cooling function requires the use of coolant at low-pressure. Both high-pressure and low pressure cannot co-exist in the same common compressor suction line.

For this reason it is desirable to design a system and method to concurrently heat one compartment and cool another with a single compressor and condenser.

SUMMARY OF THE INVENTION

An embodiment of a climate control system for a container truck of this invention includes a compressor, a condenser and at least two evaporator assemblies, capable of heating in one compartment and cooling in another.

The primary motive engine of the motor vehicle drives the compressor during most operating periods, and a standby compressor is provided for use during periods when it is not practical to operate the engine of the motor vehicle. The evaporator assemblies are mounted within separate compartments of the container and are both supplied coolant from the common condenser. The system includes a liquid line communicating coolant in a liquid state from the condenser to each of the evaporators and a hot gas bypass circuit that communicates hot gas from the compressor to each of the evaporators. Hot gas from the bypass circuit provides for heating of the specific compartment and for defrost of each of the evaporators. Coolant flow from the condenser is controlled by a liquid solenoid valve and from the bypass circuit by a hot gas solenoid valve.

Coolant exiting each of the evaporators is routed through a common circuit to the compressor. The common line is held at a predetermined coolant pressure, regardless of the coolant pressure at each of the evaporators by way of two individual crankcase pressure regulators. Each of the evaporators includes a crankcase pressure regulator such that coolant pressure within the evaporator does not vary the pressure within the common coolant line back to the compressor. The system of the subject invention is capable of cooling in one compartment with one evaporator and heating in another compartment with the other evaporator. This is accomplished by the use of the separate crankcase regulators for each evaporator. With separate crankcase regulators, heating and cooling with a common compressor is possible because the pressure in the common suction line can not be at two different pressures.

In operation, a controller controls each of the solenoid valves of the system to obtain the desired temperature. The controller selectively opens or closes either the liquid or the hot gas valve to obtain a desired temperature. The controller of this invention includes an automatic mode and a priority mode that governs how the various valves are actuated to obtain the desired compartment temperature.

The climate control system of this invention efficiently manages the actuation of the various valves to control thermostatically different temperatures in different compartments.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
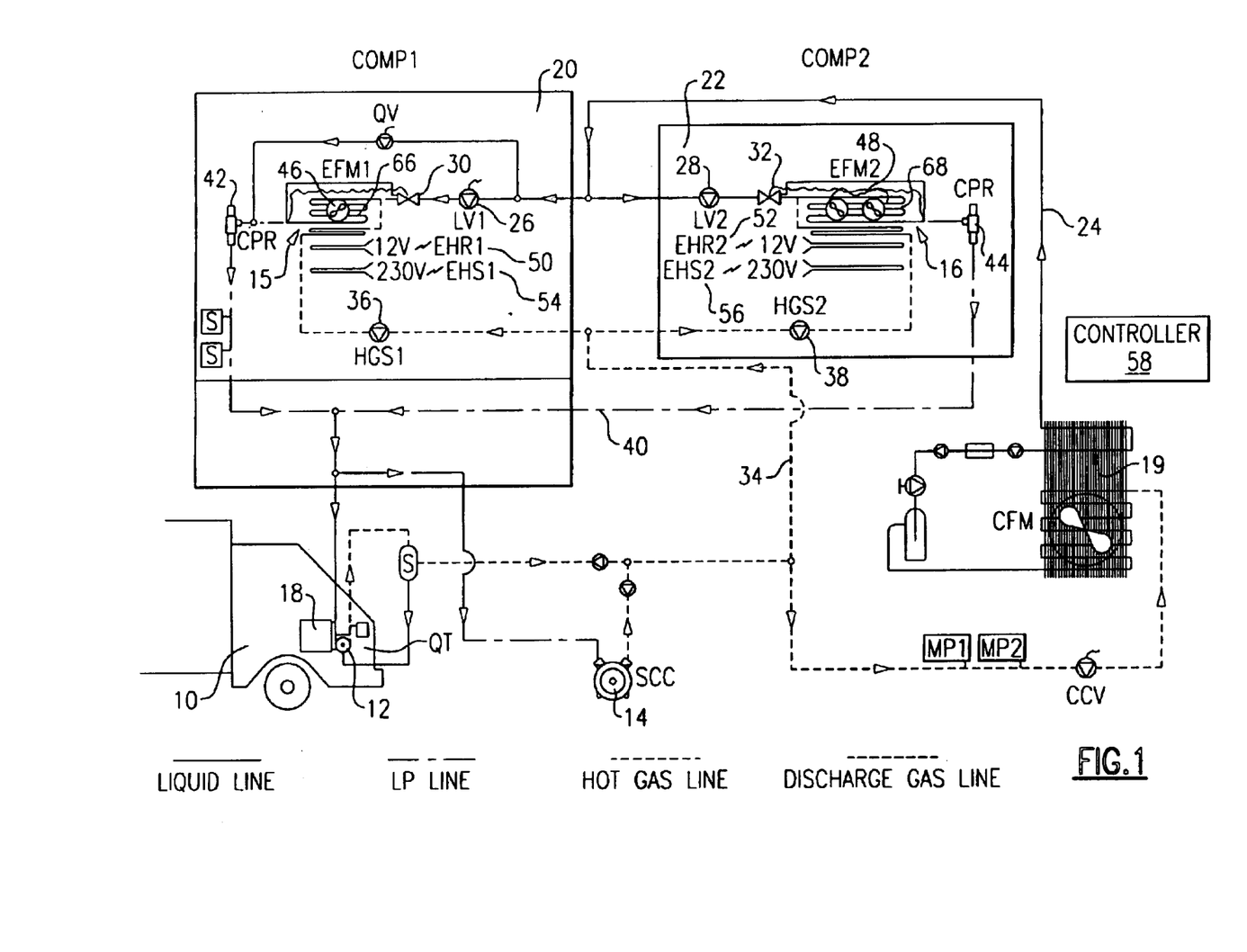
FIG. 1 is a schematic drawing of the subject climate control system.

A climate control system for a container moved by a motor vehicle 10 is shown in FIG. 1 and includes a compressor 12, a condenser 19 and at least two evaporator assemblies 15,16. The primary motive engine 18 of the motor vehicle 10 drives the compressor 12 during most operating periods, and a standby compressor 14 is provided for use during periods when it is not practical to operate the engine 18 of the motor vehicle 10.

The evaporator assemblies 15,16 are mounted within first and second compartments 20,22 and are both supplied coolant from the common condenser 19. The system includes a liquid line 24 communicating coolant in a liquid state from the condenser 19 to each of the evaporators 15,16. Each of the evaporators 15,16 includes a liquid valve 26,28 selectively actuated to allow coolant to each of the evaporators 15,16. Expansion valves 30,32 are disposed between the liquid valves 26,28 and evaporator coils 66,68. The expansion valves 30,32 and the liquid valves can by of any type known to one skilled in the art.

A hot gas bypass circuit 34 communicates hot gas from the compressor 12 to each of the evaporators 15,16. Hot gas from the bypass circuit 34 provides for heating of the specific compartment 20,22 and for defrost of each of the evaporator coils 66,68. Hot gas solenoid valves 36, 38 are disposed to selectively open and close hot gas from entering respective evaporators 15,16.

Coolant exiting each of the evaporators 15,16 is routed through a common circuit 40 to the compressor 12. The common circuit 40 is held at a predetermined coolant pressure, regardless of coolant pressures at each of the evaporators 15,16 by way of crankcase pressure regulators 42,44. The crankcase pressure regulators 42,44 for each of the evaporators 15,16 controls coolant pressure in the common coolant circuit 40 regardless of coolant pressure within each evaporator 15,16.

The addition of the crankcase pressure regulator 42,44 for each evaporator 15,16 allows for thermostatically different temperatures in each of the compartments 20,22 while using a common compressor 12, and condenser 19. In this system, coolant from the compressor 12 cools to a liquid form under pressure in the condenser 19 and is routed to the evaporators 15,16. The liquid coolant proceeds through the expansion valves 30,32 to the evaporator coils 66,68 where the coolant expands. The coolant exits the evaporator coils 66,68 at a low pressure and proceeds back to the compressor 12. The low pressure from the evaporator coils 66,68 maybe of two different low-pressure levels even in cooling—cooling mode.

For heating within one of the compartments 20, 22, coolant in the hot gas form bypasses the condenser 19 and proceeds directly to the evaporator coils 66,68. During heating, the liquid control valve 26,28 for the heated compartment 20,22 is closed and the hot gas solenoid 36,38 is opened. The system of the subject invention is capable of cooling in one of the compartment 20,22 with one of the evaporators 15,16 and heating in the other compartment 20,22. This is only accomplished because of the use of a separate crankcase regulators 42,44 for each evaporator 15,16. Without separate crankcase regulators 42,44, heating and cooling with a common compressor is not possible because the pressure in the common circuit 40 would not be compatible with the different pressure at the other evaporator 15,16. In other words, the common circuit 40 is set to a specific pressure below the lowest pressure possible at the evaporators 15,16 such that there exists at all times a sufficient pressure drop to ensure proper and efficient coolant flow. The lowest pressure possible is when the compartment is being heated and the hot gas solenoid valve for that compartment is actuated to allow low-pressure hot gas to the evaporator.

Each of the evaporators 15,16 of the subject invention include at least one fan 46,48 for blowing air across the evaporator coils 66,68 and into the compartment 20,22 to facilitate heating and cooling. The evaporators 15,16 also include electric heaters 50,52,54,56 to provide heating with in each compartment 20,22 and to defrost each of the evaporators 15,16 periodically.

In operation, a controller 58 controls the valves 36,38,26, and 28 of the system to obtain the desired temperature. The controller 58 selectively opens or closes the valves 36,38,26, and 28 based on the desired temperature and operating mode. The controller 58 includes an automatic mode and a priority mode that governs how the valves 36,38,26 and 28 are actuated to obtain the desired compartment temperature.

In the automatic mode the controller 58 operates to open the first hot gas valve 36 or the first liquid valve 26 of the first evaporator 15 depending on the temperature desired within the first compartment 20. If the temperature of the second compartment 22 is opposite that of the first compartment 20, then the system in automatic mode will operate sequentially the fans 48, the road 12/24 V electric resistance 52 or the standby single phase resistance 56, the second hot gas valve 38 or the second liquid cooling valve 28 according to a progressive pulse with modulation logic.

Figures 2, 2A:
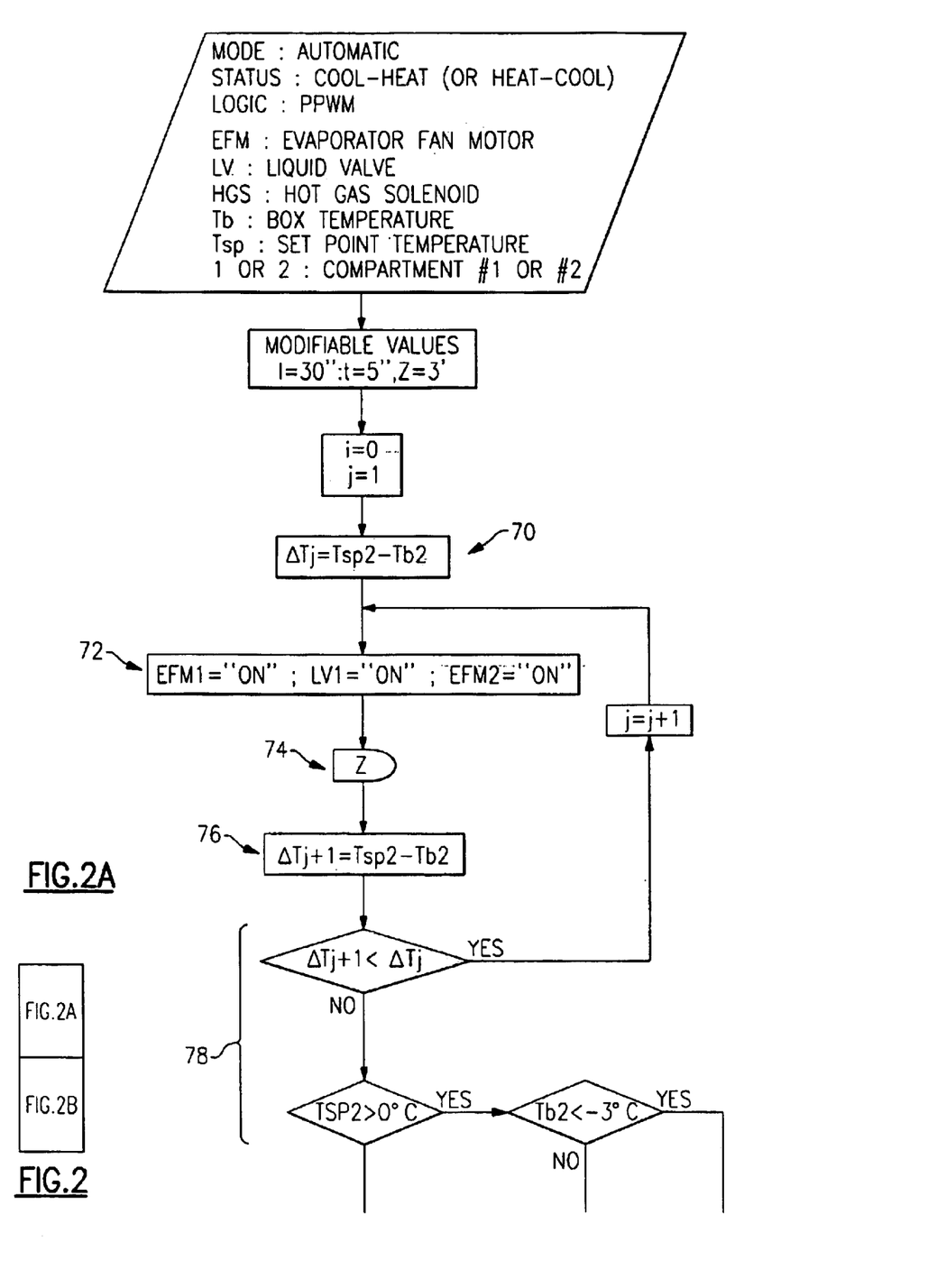
FIG. 2 is a flow chart of system operation in automatic mode for cooling in one compartment and heating in the other compartment.
Figure 2B:
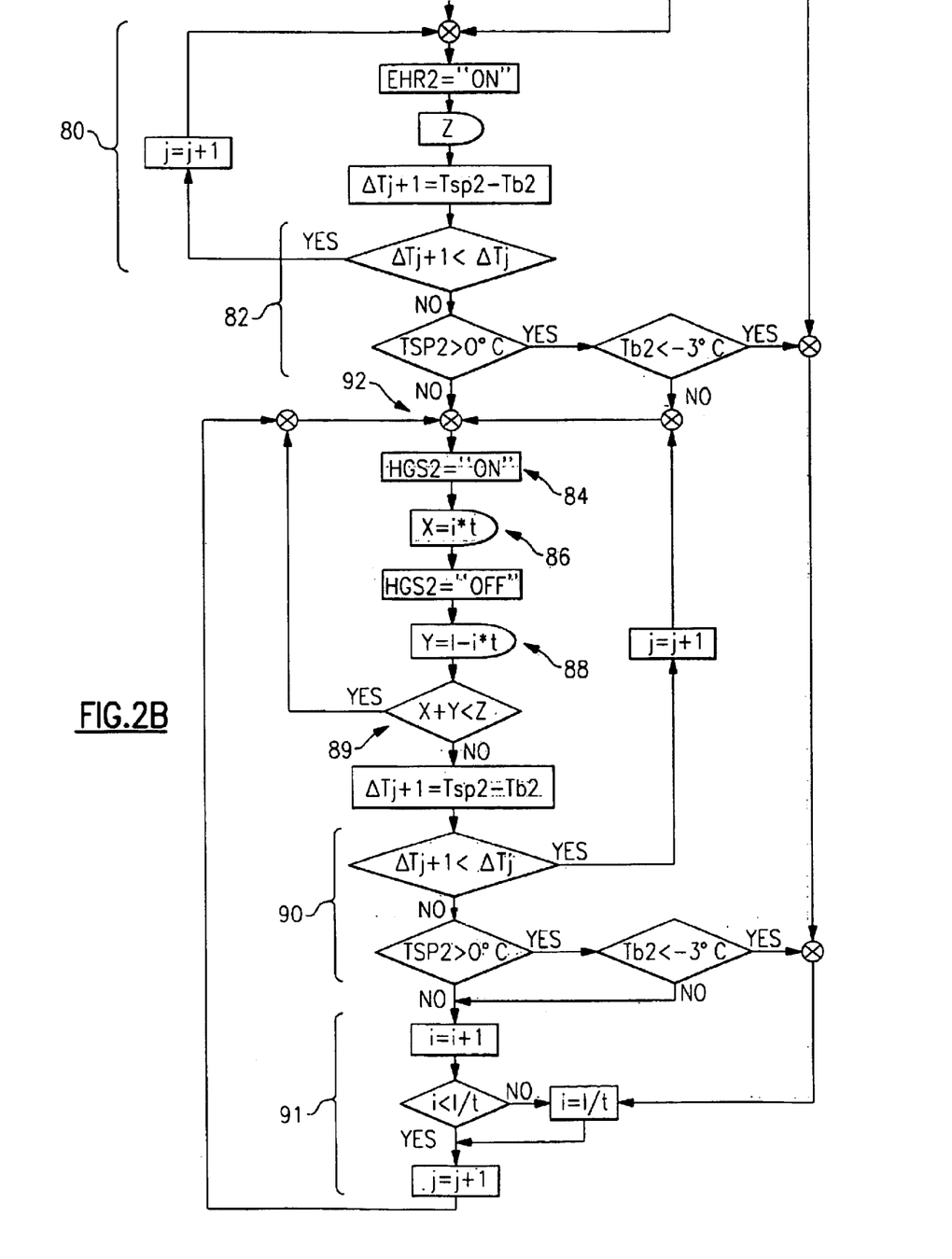

The Flow chart of FIG. 2 represents the operation of the hot gas valves 36,38 and the liquid valves 26,28 for thermostatically different temperatures between the first and second compartments 20,22. The first step, indicated at 70, is to determine a difference between a set temperature (Tsp) and a box or current temperature (Tb). The example illustrated in FIG. 2 is where the first compartment 20 is cooled and the second compartment 22 is heated. The controller begins the cycle by actuating the evaporator fans (EFM1, EFM2) and the first liquid valve 26 (LV1) as indicated at 72. A predetermined delay time, indicated at 74 by the variable Z expires before another temperature reading is taken and a difference between the desired temperature Tsp and the actual temperature Tb is again determined and a decision made in response to that difference determined at 76. Note that the temperatures monitored are those of the second compartment 22 that is heated.

The first compartment 20 is concurrently being cooled because the evaporator fan 46 and the liquid valve 26 are actuated. Decisions indicted at 78 determined if further delay is initiated or if the controller will move on to actuate the electric heaters (EHR2) 52 or (EHS2) 56 of the second evaporator 16. As indicated at 80, the electric heaters 52 or 56 are actuated and remain the only heating means until a specific difference indicated at 82 is obtained. After a difference in temperature reaches a specified difference, the controller 58 actuates the second hot gas valve 38 as indicated at 84.

The second hot gas valve 38 remains on for a specified delay time indicted at 86 and then is cycled to an off position. The second hot gas valve 38 remains off for a specified delay time indicated at 88. Note that the delay time indicated at 86 and 88 are specified in relation to the number of cycles such that as the number of times the second hot gas valve 38 is cycled changes, the "ON" time indicated at 86 relative to the "OFF" time to change the duration that the second hot gas valve 38 is "ON" as the desired temperature Tsp is approached.

The second hot gas valve 38 remains off for a duration indicated at 88 and the on/off cycle continues until the "ON" duration indicated at 86 plus the "OFF" duration indicated at 88 are less than a pre-selected duration as indicated by Z at 89. Counters indicated at 91 provide for the progressive change in the durations indicated at 88 and 86 that the second hot gas valve 36 is cycled. After reaching a difference in temperature that fulfills the specified conditions indicated at 90, the cycle is repeated from a point where the second hot gas valve was originally actuated indicated at 92.

Figure 3:
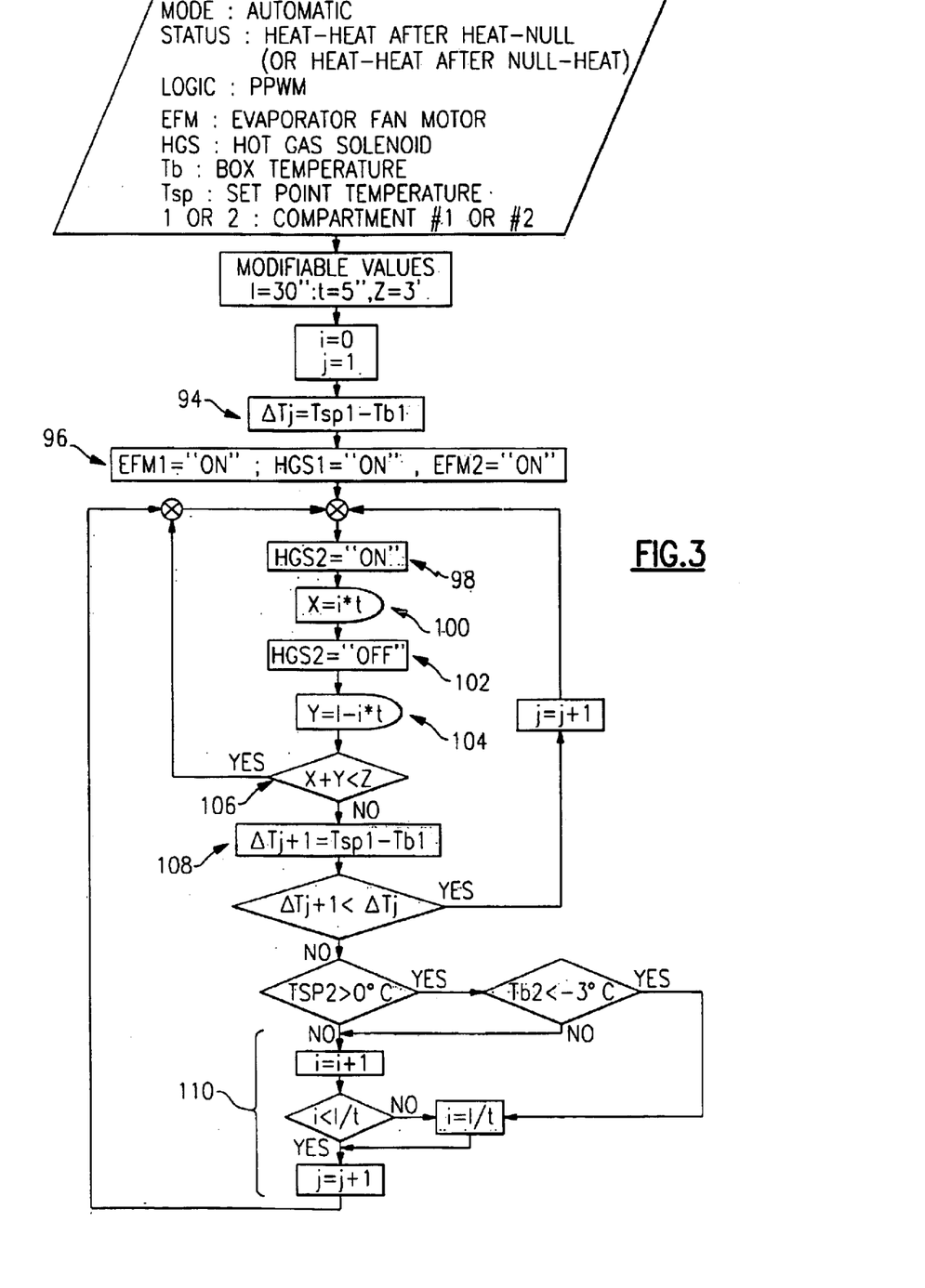
FIG. 3 is another flow chart of system operation in automatic mode for heating in both compartments.
Figure 4:
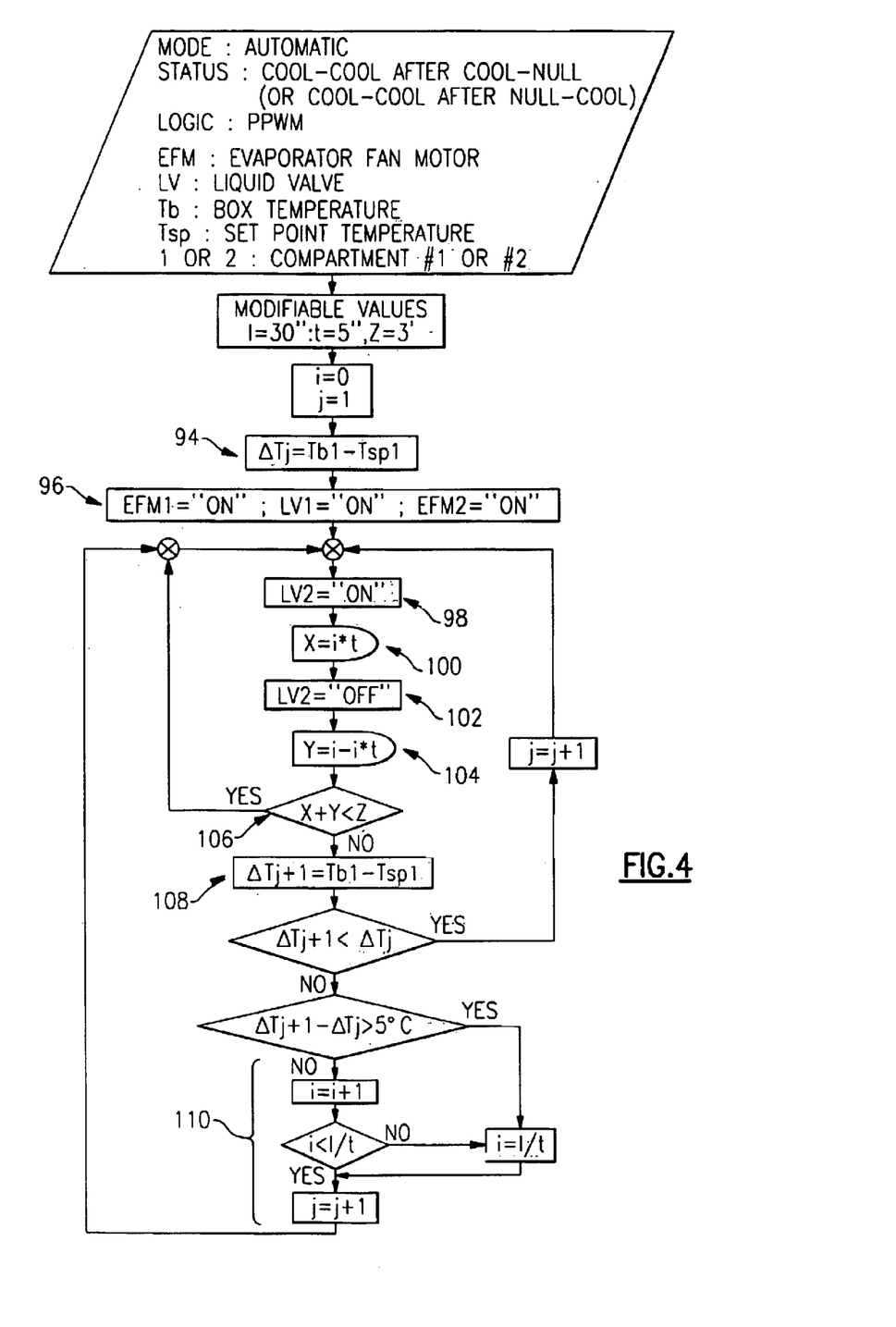
FIG. 4, is another flow chart of system operation in automatic mode for cooling in both compartments.

FIGS. 3 and 4 are Flow charts representing the order of valve actuation when both compartments 20,22 are thermostatically similar such that either heating or cooling is desired for both compartments 20,22. This does not necessarily require that the temperatures in both compartments 20,22 are to be the same, only that the desired temperature for both compartments 20,22 require either heating or cooling. FIG. 3 represents the order of operation for heating in both compartments 20,22, and FIG. 2 represents the order of operation for cooling in both compartments 20,22. Further, a null condition falls within conditions that would provide for the actuation of the valves 36,38,26, and 28. As appreciated, a null condition refers to a condition were the compartment is allowed to remain at an ambient temperature.

The order of actuating valves indicated in the Flow charts of FIGS. 3 and 4, are similar except for the substitution of the specific valve being actuated. As appreciated, for heating, the hot gas valves 36, and 38 are actuated, and for cooling the liquid valves 26,28 are actuated. Operation initiates by determined an initial difference in temperature within the first compartment as indicated at 94 in both FIGS. 3 and 4. The next step, indicated at 96, begins by actuating the cooling fans 46 and 48 for each of the evaporators 15, and 16 and either the first hot gas valve 36 or the first liquid valve 26 depending on the desired thermostatic condition. Note that the first liquid valve 26 is represented by LV1 in the flow chart. After the initial conditions are set, the second hot gas valve 38 or second liquid valves 28 are actuated as indicated at 98. The valve (38 or 28) remains on for a specified duration indicated at 100 and then is cycled to an off position indicated at 102. The valve (38 or 28) remains off for a duration indicated at 104 and the on off cycle continues until the "ON" duration indicated at 100 plus the "OFF" duration indicated at 104 are less than a pre-selected duration as indicated by Z at 106.

Another difference between the set temperature Tsp and the actual temperature Tb is then determined as indicated at 108. According to the determined difference in temperature indicated at 108, counters, indicated at 110 are incremented to progressively increase or decrease the delay times indicated at 100 and 104 such that the "ON" time of the valve actuated at 102 is progressively changed until the desired temperature is obtained.

The priority mode operates differently from the automatic mode in that when each of the compartments 20,22 requires different thermostatic conditions, such as heating in one and cooling in the other, the liquid valve or hot gas valve of a priority evaporator is actuated and the liquid valve or hot gas valve of the other evaporator is simply left off. In this way it is assured that the proper temperature within the priority compartment will be obtained quickly and maintained on a priority status.

Figure 5:
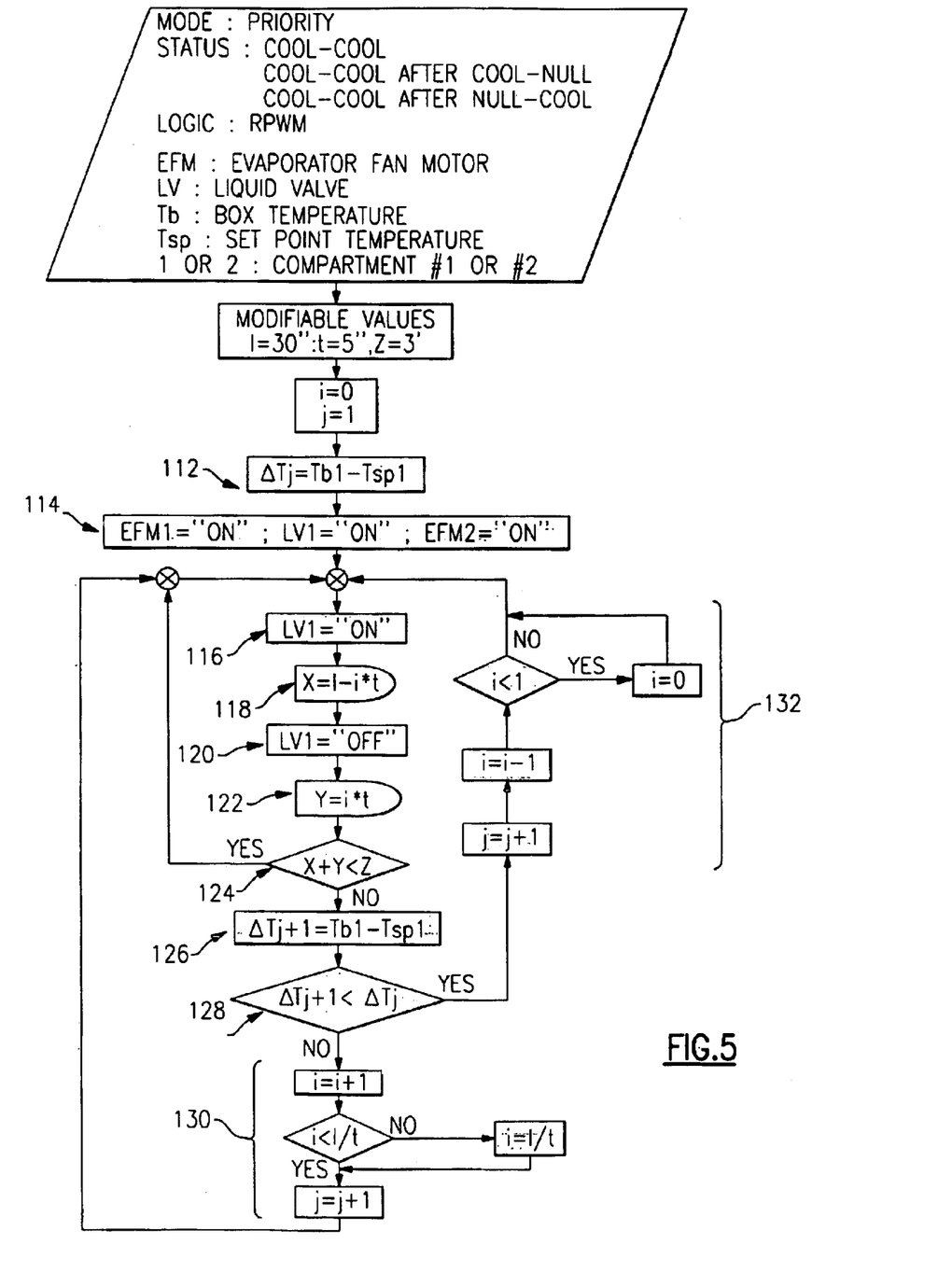
FIG. 5, is a flow chart of system operation in priority mode for cooling in both compartments.
Figure 6:
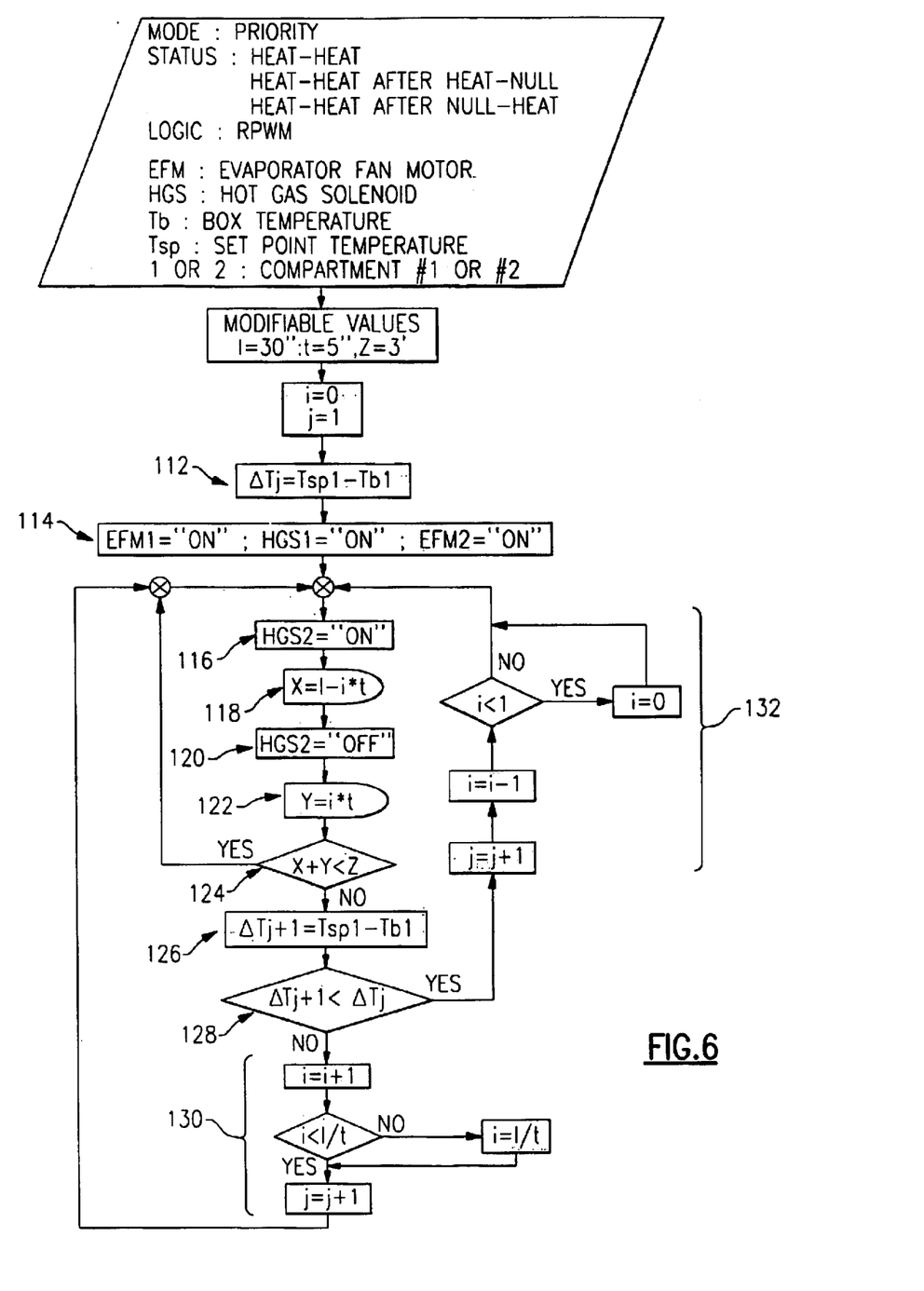
FIG. 6, is a flow chart of system operation in priority for heating in both compartments.

Referring to the flow charts of FIGS. 5 and 6, when similar thermostatic conditions are required in both compartments 20,22 the corresponding valve of the priority compartment is actuated and the corresponding valve of the other evaporator is selectively actuated according to a regressive pulse with modulation logic shown in the flow charts of FIGS. 5 and 6. For illustrative example, the first compartment 20 is designated as the priority compartment. As appreciated, the priority compartment is a selection made according to specific configuration of the climate control system, as understood by one skilled in the art.

FIG. 5 is a flow chart indicating the order of operation when cooling is required in both the priority compartment 20 and the second compartment 22, and FIG. 6 represents operation when heating is required in both compartments 20,22. As appreciated, the hot gas valves 36 and 38 are actuated for heating and the liquid valves 26 and 28 are actuated for cooling. Referring to both FIGS. 5 and 6 the order of operation is initiated by determining a difference in the set temperature Tsp and the actual temperature Tb indicated at 112 in both FIGS. 5 and 6. Initial actuation, as indicated at 114, of the cooling fans 46 and 48 and the priority compartment valve (36 or 26). The valve (38 or 28) for the second compartment is actuated as indicated at 116 for a duration indicated at 118.

The valve (38 or 28) is then cycled off for the duration indicated at 22. The total cycle time is then determined at 124 and if less then the predetermined duration identified as "Z" the on/off cycle of the valve is continued. The difference in temperature is determined as indicated at 126 such that if the current difference is less than a previous difference the duration of on/off cycle time is changed as indicated at 132, otherwise the duration is changed as indicated by 130. As the temperature difference is decreased, that is it is less than a previous measured temperature difference, the on/off cycle time is reduced, otherwise the on/off cycle time of the second valve (38 of 28) is increased until the desired temperature Tsp is obtained. In this way, it can be assured that the temperature within the priority compartment 20 is maintained before the temperature in the second compartment 22 is adjusted or accommodated.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of controlling a climate control system for a container assembly comprising the steps of;
    a. providing a climate control system including a compressor, a condenser and first and second evaporators disposed in first and second compartments, and including first and second crankcase pressure regulators, first and second hot gas valves, and first and second liquid valves;
    b. selectively actuating at least one of said hot gas and liquid valves for said first and second evaporator according to a predefined mode to separately and independently control temperatures within each of said first and second compartments.

2. The method of claim 1, wherein one of said modes of operation is an automatic mode.

3. A method of controlling a climate control system for a container assembly comprising the steps of:
    a. providing a climate control system including a compressor, a condenser and first and second evaporators disposed in first and second compartments, and including first and second crankcase pressure regulators, first and second hot gas valves, and first and second liquid valves;
    b. selectively actuating at least one of said hot gas and liquid valves for said first and second evaporator according to an automatic mode to separately and independently control temperatures within each of said first and second compartments, wherein said automatic mode comprises heating both of said compartments by actuating said first hot gas valve to allow flow of hot gas into said first evaporator, and cycling said second hot gas valve between an actuated position and a non-actuated position according to a predetermined schedule.

4. A method of controlling a climate control system for a container assembly comprising the steps of:
   a. providing a climate control system including a compressor, a condenser and first and second evaporators disposed in first and second compartments, and including first and, second crankcase pressure regulators, first and second hot gas valves, and first and second liquid valves;
   b. selectively actuating at least one of said hot gas and liquid valves for said first and second evaporator according to an automatic mode to separately and independently control temperatures within each of said first and second compartments, wherein said automatic mode comprises cooling both of said compartments by actuating said first liquid control valve to allow liquid coolant flow into said first evaporator, and cycling said second liquid control valve between and actuated position and a non-actuated position.

5. A method of controlling a climate control system for a container assembly comprising the steps of:
   a. providing a climate control system including a compressor, a condenser and first and second evaporators disposed in first and second compartments, and including first and second crankcase pressure regulators, first and second hot gas valves, and first and second liquid valves:
   b. selectively actuating at least one of said hot gas and liquid valves for said first and second evaporator according to an automatic mode to separately and independently control temperatures within each of said first and second compartments, wherein said automatic mode comprises cooling in said first compartment and heating in said second compartment by actuating said first liquid valve, and cycling said second hot gas valve between an actuated and non-actuated position.

6. The method of claim 5, further defining said cycling of said second hot gas valve between said actuated and non-actuated position by actuating said second hot gas valve such that said actuated time progressively changes relative to said non-actuated time as said desired temperature is approached.

7. A method of controlling a climate control system for a container assembly comprising the steps of:
   a. providing a climate control system including a compressor, a condenser and first and second evaporators disposed in first and second compartments, and including first and second crankcase pressure regulators, first and second hot gas valves, and first and second liquid valves;
   b. selectively actuating at least one of said hot gas and liquid valves for said first and second evaporator according to a predefined mode to separately and independently control temperatures within each of said first and second compartments, wherein said mode is further defined as priority mode, such that said first and second hot gas valves and first and second liquid control valve are actuated with respect to a designated priority compartment.

8. The method of claim 7, wherein said priority mode further defines step by actuating one of said first liquid valve or hot gas valve and not actuating either of said second liquid valve or hot gas valve for conditions where said desired temperature for said first compartment and said second compartment are thermostatic opposites.

9. The method of claim 7, wherein said priority mode further defines said step c for conditions where said first and second compartments are thermostatically similar such that heating or cooling is required in both of said compartments by actuating said first liquid or hot gas valve and cycling either said second liquid valve or hot gas valve between an actuated and non-actuated position by actuating said second hot gas valve such that said actuated time progressively decreases relative to said non-actuated time as said desired temperature is approached.

10. A climate controlled container assembly including at least two separate storage compartments comprising;
   a climate control system including one compressor, one condenser and at least two evaporators, each of said evaporators disposed hi separate compartments,
   a crankcase pressure regulator for each evaporator regulate pressure from said evaporator to said compressor,
   a hot gas valve and a liquid valve for each of said evaporators;
   a controller to separately and independently manage temperatures in each of said compartments, said controller selectively actuating said hot gas and said liquid valves in response to a desired temperature in each of said compartments.

11. The assembly of claim 10, wherein each of said crankcase pressure regulators maintains a common suction pressure between each of said evaporators and said compressor such that such that one of said evaporators may receive fluid at low pressure and the other of said evaporators may receive fluid at high pressure.

12. The assembly of claim 10, wherein said controller selectively actuates said hot gas valve and said liquid valve according to a specified mode of operation.

13. The assembly of claim 12, wherein said gas and liquid valve for one evaporator are selectively actuated, and said gas and liquid valves of said other evaporator are selectively actuated according to a predefined schedule.

14. The assembly of claim 10, wherein said assembly is mounted to a motor vehicle including a primary engine for running said motor vehicle, said compressor driven by said motor vehicle.

15. The assembly or claim 10, wherein said assembly includes a standby compressor for operation during periods when it is impractical to operate said primary engine.

* * * * *

UNITED STATES PATENT AND TRADEMARK OFFICE
CERTIFICATE OF CORRECTION

PATENT NO. : 6,804,972 B2
DATED : October 19, 2004
INVENTOR(S) : El-Habhab

It is certified that error appears in the above-identified patent and that said Letters Patent is hereby corrected as shown below:

<u>Title page,</u>
Item [75], Inventors, please insert -- Andre' Georges Stumpf, Bonsecours (FR) --.

<u>Column 8,</u>
Line 8, please insert -- c -- after "step" and before -- by --.
Line 28, "hi" should be -- in --.
Line 29, please insert -- to -- after"evaporator" and before "regulate".
Line 41, please delete the second occurrence of "such that".
Line 55, "or" should be -- of --.

Signed and Sealed this

Fourth Day of January, 2005

JON W. DUDAS
*Director of the United States Patent and Trademark Office*